No. 822,202. PATENTED MAY 29, 1906.
A. G. FLAGG.
STOVEPIPE COUPLING.
APPLICATION FILED OCT. 20, 1905.
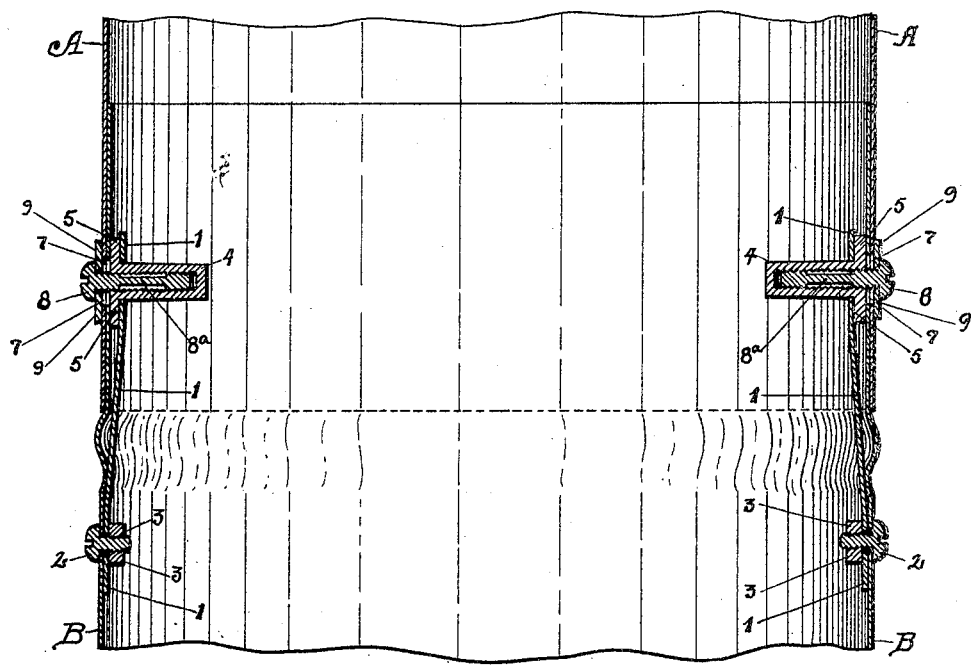
Fig. 1.
Fig. 2.
Fig. 6.
Fig. 3.
Fig. 4.
Fig. 5.
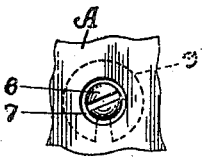
Fig. 7.
WITNESSES:
S. C. Duvall.
H. R. Marlatt.
A. G. FLAGG,
INVENTOR.
BY Robert W. Randle
ATTORNEY.

UNITED STATES PATENT OFFICE.

ALVERNIS G. FLAGG, OF RICHMOND, INDIANA, ASSIGNOR OF ONE-FOURTH TO GEORGE H. KRAMER, OF RICHMOND, INDIANA.

STOVEPIPE-COUPLING.

No. 822,202.  Specification of Letters Patent.  Patented May 29, 1906.

Application filed October 20, 1905. Serial No. 283,613.

*To all whom it may concern:*

Be it known that I, ALVERNIS G. FLAGG, a citizen of the United States, residing in the city of Richmond, in the county of Wayne, and in the State of Indiana, have invented new and useful Improvements in Stovepipe-Couplings, of which the following is a full, clear, and exact description, such as will enable others familiar with the art to which it relates to make and use the same.

This present invention has particular reference to new and improved means for connecting together the overlapping ends of stovepipe.

The object of my invention, broadly speaking, is to provide a simple, efficient, and inexpensive means for coupling securely together the ends of sections of stovepipe or the like.

A more specific object is to provide a very simple means for securing together the ends of sections of sheet-metal stovepipes or the like, which means may be easily attached to the sections of pipe to be coupled and by which the sections may be easily attached and detached to and from each other, but which will not be liable to become detached inadvertently; and, finally, my object is to provide a new stovepipe-coupling, providing a new article of manufacture which can be made and sold at a comparatively low price.

Other specific objects and particular advantages will be made apparent in the course of the ensuing specification, and the particular improvements will be pointed out in the appended claims.

The manner of the construction of my invention and its application are illustrated most clearly in the accompanying drawings, in which—

Figure 1 is a central longitudinal section taken through the meeting ends of portions of two sections of pipe, my invention being shown in central section as applied thereto. Fig. 2 is an isometrical view of the spring member of my invention. Fig. 3 is a perspective view of the barrel member of my invention. Fig. 4 is a perspective view of the screw member of my invention. Fig. 5 is an isometrical view of the washer which I employ. Fig. 6 is a cross-section of the said screw, as taken on the line X X of Fig. 4; and Fig. 7 is a face detail view of the screw and aperture through which it operates and of the washer shown in dotted lines.

Similar reference characters denote like parts throughout the several views of the drawings.

It should be noticed that the parts shown on the right and left of Fig. 1 are exact duplicates of each other, there being in this instance two of my devices employed to accomplish the coupling of one joint formed by two sections of pipe, and therefore the parts shown on the left only will be described in detail.

In order that my invention may be fully understood and its advantages appreciated, I will now take up the detail description thereof and will refer to the various parts and their intended operation as briefly and as compactly as I may.

Referring to the drawings, the letter A denotes the lower portion of the upper section of the pipe, while the letter B denotes the upper portion of the lower section of pipe, the latter telescoping somewhat into the former in the usual manner, as shown in Fig. 1.

The numeral 1 designates a flat resilient spring member of oblong shape having a round aperture $a$ formed therethrough near one end and a square aperture $b$ formed therethrough near its other end, as shown in Fig. 2. The spring member 1 is adapted to be secured to the inner face of the section B, as shown, by means of the screw 2 and the nut 3, which screw passes through an aperture therefor formed through the section B, with the nut threaded on the screw and located on the interior of the section, as shown in Fig. 1, whereby the member 1 is supported vertically, with its upper half extending above the line of the lower end of the upper section A.

The barrel consists of the square shank portion 4, having integral therewith on one end the round flat head 5 of larger diameter and having a round threaded socket-aperture 6 extending centrally through the head 5 and almost entirely through the shank 4 longitudinally, as shown in Figs. 1 and 3. The square shank 4 is adapted to freely enter the square hole $b$ of the spring member with the face of the head 5 facing outward to engage the inside of the pipe-section B, as shown in Fig. 1.

Apertures 7 are formed through the overlapping portions of the sections A and B of the pipe, which apertures are of a size sufficient to allow the head of the screw 8 to easily pass therethrough when they are opposite to each other, as shown most clearly in Fig. 7.

The screw 8 is threaded from head to point and the central portion is cut away on two opposite sides to form the flattened shank $8^a$. (Shown in Figs. 1 and 4.)

The numeral 9 denotes a washer, having a central aperture 10 therethrough, and a slot 11, connecting the aperture 10 with the periphery of the washer, as shown in Fig. 5. The size of the aperture 10 is only slightly more than is the diameter of the end portions of the threaded part of the screw 8, while the width of the slot 11 is such as will allow the shank $8^a$ of the screw to pass therethrough flatwise.

Operation: It will now be seen that the spring 1 may be secured to the section B, as stated, being secured by the screw and nut 2 and 3, respectively, or in place thereof the spring may be permanently riveted or otherwise secured, whereby it is caused to stand in the position relatively as shown in Fig. 1.

The square shank 4 of the barrel is now entered in the hole $b$, with the inner face of the head 5 in contact with the spring 1, as shown. The screw 8 is then screwed into the threaded aperture 6 until its head is a slight distance away from the head 5 of the barrel. After the above arrangement the lower end of the section A of the pipe is brought telescopically over the upper end of the section B of the pipe in the ordinary manner, bringing the apertures 7 of the sections into register with each other and opposite to the head of the screw 8, which will allow the head of the screw 8 to be forced out beyond the periphery of the pipe, after which the screw 5 is adjusted whereby the shank $8^a$ thereof is exposed outside the periphery of the pipe. After the above the washer 9 may be placed over the shank $8^a$ of the screw and the washer brought out in contact with the head of the screw, which will lock the washer and prevent it from dropping off as the screw is turned.

Now by turning the screw with a driver its point will enter the aperture 6 and will draw its head against the washer 9, and continuing will clamp together at this point the sections A and B of the pipe, thus accomplishing the object of this invention without the necessity of placing one's hand inside the pipe-sections, and, conversely, if it be desired to separate the sections I have only to loosen the screw 8 and allow the washer 9 to drop out of engagement, and then on pressing in on the screw the parts will by reason of the flexibility of the spring 1 be moved in out of the way, whereby they will not interfere with the separation of the sections A and B in the usual manner. In like manner a similar coupling should be employed to connect the sections A and B at the opposite side from that just described, as shown in Fig. 1, whereby the sections may be more securely coupled together, or even three or four of the couplings may be employed, depending on conditions; but usually two of the couplings will be found sufficient for each joint.

From the above description, when taken in connection with the accompanying drawings, it will be seen that I have produced a new stovepipe-coupling which embodies the objects and advantages above referred to.

While I have illustrated and described the best means now known to me for carrying out the objects of my invention in a practical manner, I desire that it be fully understood that I do not restrict myself to the exact details of the construction shown and described, but hold that any changes or variations therein as would suggest themselves to the ordinary mechanic would clearly fall within the limits and scope of my invention.

Having now fully shown and described my invention, what I claim, and desire to secure by Letters Patent of the United States, is—

1. A stovepipe-coupling comprising in combination with two telescoping pipe-sections, a flat spring member secured at one end to one of the pipe-sections and having a square aperture therethrough, a barrel adapted to rest in said square aperture, a screw threaded into said barrel and adapted to pass through registering apertures therefor formed through the overlapping ends of the pipe-sections, a washer adapted to surround the stem of the screw outside the pipe-sections, and so formed as to permit its removal without removing the screw, all substantially as set forth.

2. In combination with two sections of stovepipe telescoping together in the usual manner and having registering holes therethrough in their overlapping portions, a flat spring secured to one of the sections and extending inside the pipe over the other section, a barrel carried by said spring, a screw insertible in said barrel with its head adapted to pass through said holes in the pipe-sections, a washer carried by said screw outside the pipe-sections and being of larger diameter than said holes in the pipe-sections, and being so formed as to permit its removal without removing said screw, all substantially as described and for the purposes set forth.

3. In combination with two sections of stovepipe joined together in the usual manner with apertures formed therethrough in their overlapping portions, a flat spring secured on the inside of one of the pipe-sections and having a square aperture therethrough, a barrel seated in said square aperture and having a threaded aperture extending thereinto, a screw adapted to run in said threaded aperture with its head adapted to pass through said apertures in the pipe-section, a flat shank formed in a portion of the length of said screw, a washer having a slot adapted to pass over said flat shank of the screw and of a size which will not permit it to pass through said apertures in the pipe-sections and located on the screw outside the pipe-sections, whereby as the screw is tightened the pipe-sections will be clamped together at that point, all substantially as and for the purposes set forth.

In testimony whereof I have hereunto signed my name to this specification in the presence of two subscribing witnesses.

ALVERNIS G. FLAGG.

Witnesses:
GEORGE H. KRAMER,
ROBERT W. RANDLE.